UNITED STATES PATENT OFFICE.

CARLETON ELLIS, OF MONTCLAIR, NEW JERSEY.

COLLOIDAL-MANGANESE-DIOXID DEPOLARIZER.

1,169,943.  Specification of Letters Patent.  Patented Feb. 1, 1916.

No Drawing.  Application filed October 23, 1915. Serial No. 57,433.

*To all whom it may concern:*

Be it known that I, CARLETON ELLIS, a citizen of the United States, and a resident of Montclair, in the county of Essex and State of New Jersey, have invented certain new and useful Improvements in Colloidal-Manganese-Dioxid Depolarizers, of which the following is a specification.

This invention relates to depolarizers adapted for use in the Leclanché cell, especially for miniature dry batteries and the like and relates particularly to the use of colloidal manganese dioxid in the manner more fully hereinafter described and as claimed.

Colloidal manganese dioxid may be prepared in a variety of ways and this material has useful depolarizing properties, especially when coagulated from the sol to the gel state. When such coagulation takes place around fine particles of ordinary manganese dioxid, such as pyrolusite and the like, a coating of the colloidal material is obtained which not only is a useful depolarizing agent but also serves as a binder or cementing agent to bond the particles of graphite and manganese dioxid, so that a very firm depolarizing mass is secured, which stands shipping and rough handling in pocket batteries. A manganese dioxid gel may be incorporated with the other materials constituting the depolarizing mass to produce a plastic which is molded to shape.

While it is also possible to use the colloidal manganese dioxid herein without other form of dioxid, it is preferred to use the colloidal material in the manner described. In place of mineral manganese or pyrolusite, various other forms of manganese dioxid or higher oxid of manganese may be used including hydrated and anhydrous artificial manganese dioxid, mangano-manganites of various forms and also the manganites of other bases, both of a neutral and acid or basic character.

While graphite is preferred as the conducting agent, various other forms of carbon such as coke and the like may be used in some cases, according to the degree of conductivity required.

The depolarizing element is preferably formed as a mass of the manganese material and graphite about a carbon rod and this electrode is immersed in an exciting fluid of ammonium chlorid solution or paste contained in a zinc cup or container.

The colloidal and non-colloidal manganese material may be used in the proportion or ratio of 1:10, which affords a product of excellent conductivity due no doubt to the bonding effect of the colloidal higher oxid of manganese.

An illustrative composition made in accordance with the present invention is as follows:—Five parts of glucose are dissolved in twenty parts of water and cooled in ice. Four parts of a ten per cent. solution of caustic soda is added and then one hundreds parts of a five per cent. solution of potassium permanganate is added little by little while the mixture is cooled with ice and is constantly stirred during the addition of the permanganate. After the latter has been added the mass stiffens in a few minutes to a jelly and on standing this begins to contract and break up into flocks with separation of liquid. This action is facilitated by heating when the gelatinous flocks of manganese material fall to the bottom and the clear layer on top is removed by decantation. Washing is carried out by decantation if desired, avoiding such condition of freedom of saline material that the manganese redissolves. When forming the colloidal manganese around particles of mineral or artificial manganese dioxid and the like the above reaction is preferably carried out in the presence of these bodies, the operation being otherwise conducted in substantially the same manner as above. The depolarizer so formèd has the property of compacting to a firm mass which is capable of being handled without breakage losses and which is in such an active condition that it is especially suited for miniature batteries used in pocket flash lights and the like.

What I claim is:—

1. A depolarizer for batteries of the Leclanché type comprising carbonaceous material and manganese dioxid material comprising colloidal manganese dioxid.

2. A depolarizer for batteries of the Leclanché type comprising non-colloidal manganese dioxid cemented to graphite particles by colloidal manganese dioxid.

3. A depolarizer for batteries of the Leclanché type comprising non-colloidal manganese dioxid bonded by colloidal manganese dioxid material.

4. A depolarizer for batteries of the Leclanché type comprising a higher oxid of manganese cemented to carbon particles by colloidal manganese dioxid.

5. A depolarizer for batteries of the Leclanché type comprising particles of non-colloidal manganese dioxid material cemented to graphite particles by a colloidal higher oxid of manganese dioxid.

6. A depolarizer for batteries of the Leclanché type comprising non-colloidal manganese dioxid cemented to graphite particles by colloidal manganese dioxid, the ratio of colloidal manganese to other forms of manganese being approximately 1:10.

CARLETON ELLIS.